United States Patent Office 2,763,836
Patented Sept. 18, 1956

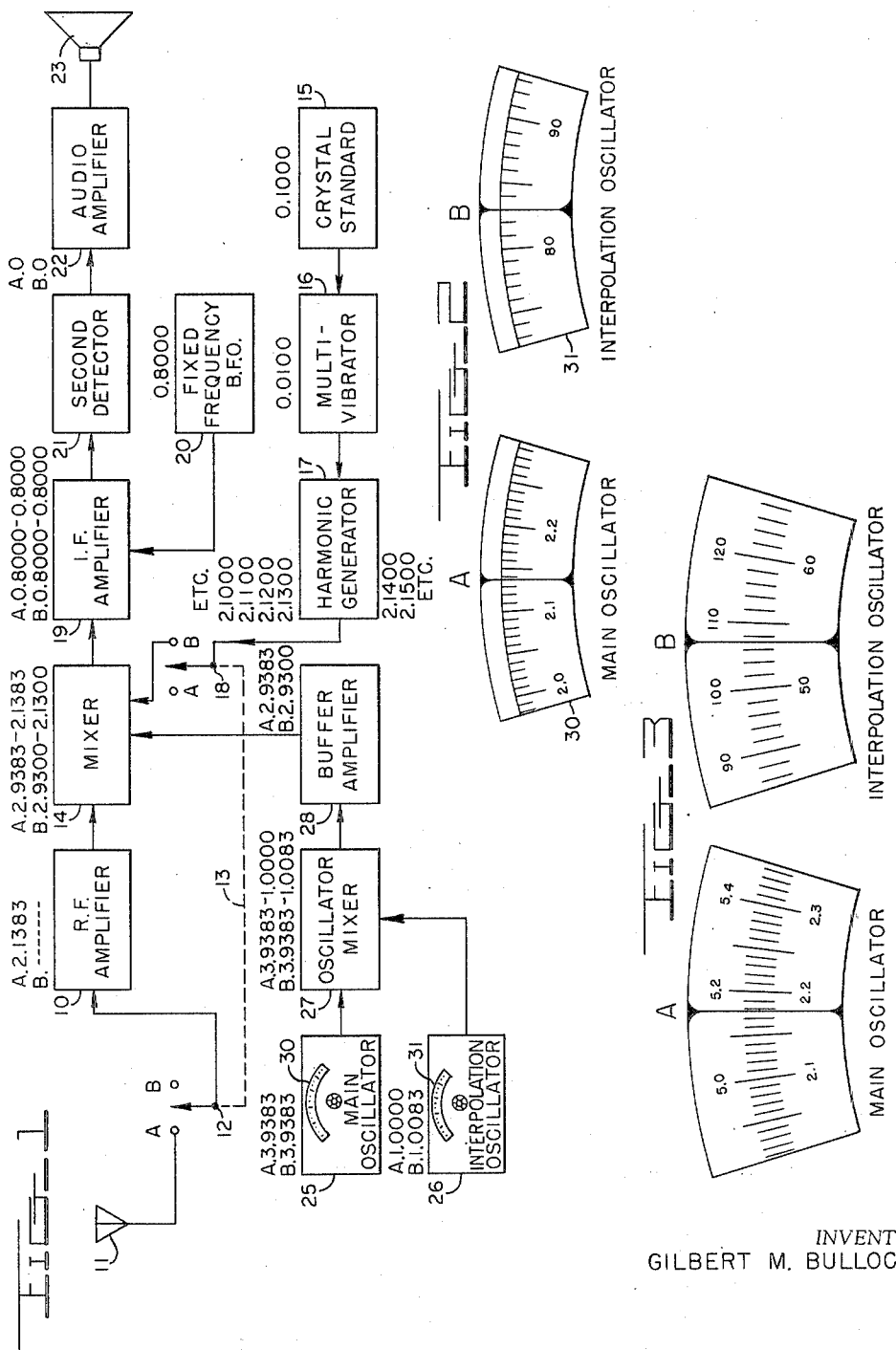

2,763,836

FREQUENCY MEASURING RECEIVER

Gilbert M. Bullock, Forestville, Md.

Application December 29, 1950, Serial No. 203,461

7 Claims. (Cl. 324—79)

(Granted under Title 35, U. S. Code (1952), sec. 266)

This invention relates generally to frequency measuring devices and more particularly to a receiver system for measuring intermittent radio signals with a high degree of accuracy.

There are many applications in the electronic art in which it is desirable to accurately measure the frequency of signals which may occur only intermittently. The usual frequency measuring devices have proved unsuitable for measuring signals of short duration since they require the presence of the signal until the necessary intricate adjustments have been completed for providing an accurate frequency reading.

It is therefore an object of this invention to provide a frequency measuring device requiring the presence of the signal during only a preliminary step in its frequency measurement.

It is another object of this invention to provide a simple apparatus for providing accurate frequency measurement.

It is another object of this invention to provide a superheterodyne circuit for frequency measurement.

It is another object of this invention to provide a superheterodyne receiver system for accurate frequency measurement of intermittent signals.

Other objects and advantages of this invention will be apparent from the following description and accompanying drawings, wherein:

Fig. 1 is a block diagram of an exemplary embodiment of this invention;

Fig. 2 is an enlarged view of a portion of Fig. 1; and

Fig. 3 shows the apparatus of Fig. 2 in a variant embodiment of this invention.

Briefly, this invention applies the superheterodyne receiver principle to frequency measurement. With this invention the frequency of a signal received only for an instant may be leisurely measured without the presence of the signal by measuring the frequency of the local oscillator and adding or subtracting the intermediate frequency. To insure accuracy this invention provides certain departures from conventional receiver and frequency measurement designs which are described in detail below.

Referring now to Fig. 1 in detail, a radio frequency amplifier stage 10 is connected to a suitable antenna 11 through one half 12 of a two position gang switch 13. The output of the R. F. stage 10 is applied to a mixer stage 14. A crystal controlled frequency standard 15 is connected to a multivibrator 16 where the crystal frequency is subdivided. The multivibrator output is applied to a harmonic generator 17 to provide a wide spectrum of equally spaced frequency components which are known as crystal check points. In the embodiment described these check points are spaced 10 kc. apart. The harmonic generator output is applied to mixer 14 through the second half 18 of gang switch 13. It will be noted that when this switch 13 is in position A the antenna is connected to the R. F. amplifier and the harmonic generator is disconnected from the mixer. Conversely when the switch is in position B the harmonic generator is connected to the mixer and the antenna is disconnected.

The output of mixer 14 is applied to an intermediate frequency amplifier 19 which, in the embodiment of Fig. 1, is tuned to 800 kc. A fixed frequency beat oscillator 20 is also tuned to 800 kc. and connected to the I. F. amplifier 19 to provide aural detection of an input signal. The I. F. output is applied through a second detector 21 to an audio amplifier 22 and loudspeaker 23.

The local oscillator arrangement of this invention includes two oscillators, a main oscillator 25 having a frequency range equal to the tuning range of the system, and a second oscillator 26, which may be descriptively labelled an interpolation oscillator, having a narrow frequency range sufficient only to cover the frequency range between crystal check points from the harmonic generator 17. The range of the interpolation oscillator in this embodiment will then be 10 kc. The signals of the two oscillators are combined in an oscillator mixer 27 which extracts the difference frequency and feeds it is to a buffer amplifier 28 which further attenuates other frequencies produced by the mixing of the two oscillator frequencies. The output of the buffer amplifier 28 is applied to the mixer 14 where it is mixed either with received signals from R. F. amplifier 10 or the crystal check points from harmonic generator 17 depending upon the position of switch 13.

The oscillators 25 and 26 are equipped with tuning dials 30 and 31 respectively and the frequency of the measured signal is determined from these dials. For an understanding of the manipulation of these dials and the operation of the circuit, consider now the following example:

Suppose the receiver system of Fig. 1 is designed to operate in the range of 1.20 and 3.20 mc. and a signal having a frequency of 2.1383 mc. is picked up by antenna 11. With switch 13 in position A, interpolation oscillator 26 is set at the minimum end of its frequency range and main oscillator 25 is tuned for zero beat at speaker 23 between the received signal in I. F. amplifier 19 and the fixed frequency B. F. O. 20.

As an aid in understanding the operation in this particular example, frequencies have been listed above various blocks in Fig. 1. The frequencies are labelled A and B to indicate the frequency present in a particular block for positions A and B respectively of switch 13. Having selected an 800 kc. intermediate frequency for the system, the main oscillator frequency less the interpolation oscillator frequency must be tuned 800 kc. away from the signal frequency. The choice of the interpolation oscillator frequency is arbitrary but its frequency range should be the frequency difference between adjacent crystal check points from harmonic generator 17. For convenience in measurement this frequency range should correspond to the smallest frequency division on the dial of main oscillator 25.

In the embodiment of Fig. 1, the interpolation oscillator operates between 1.0 mc. and 1.01 mc. It therefore follows that with the interpolation oscillator set to 1.0 mc., to tune in a signal at 2.1383 mc. for zero beat, the main oscillator must be tuned to the signal frequency 2.1283 mc. plus the I. F., 800 kc., plus the interpolation oscillator zero setting, 1.0 mc., which totals 3.9383 mc. The main oscillator dial 30 is calibrated to read the first three digits of the signal frequency, in the instant example it will read between 2.13 and 2.14 mc. as shown in the enlarged view in Fig. 2A.

Having tuned the main oscillator to obtain a zero beat with the received signal, the switch 13 is thrown to position B. It will be noted that the antenna 11 is now disconnected from the system and the presence of the received signal is no longer required. A wide range of frequency check points are now applied to mixer 14 through section 18 of switch 13. The next step is to increase the frequency of the interpolation oscillator 26 until the difference frequency between main oscillator 25 and interpolation oscillator 26 zero beats with a crystal check point from harmonic generator 17. Since the combined local oscillator frequency was tuned for zero beat with the signal frequency, the particular check point with which a zero beat is now established by increasing the local oscillator frequency will of course be the one closest to and below the signal frequency. In the instant example the check point frequency from harmonic generator 17 used will have a frequency of 2.13 mc. Since the main oscillator frequency is 3.9383 mc., a .0083 mc. shift in the interpolation oscillator is required to obtain zero beat with a 2.1300 mc. check point. The interpolation oscillator dial 31 now reads 83 as shown in the enlarged view in Fig. 2B. The frequency of the signal is now determined by reading the main oscillator dial 30 to the smallest division below the pointer and adding to this reading that of dial 31.

The operational steps necessary for measuring the frequency of a signal only require tuning for zero beat twice, throwing a switch, and reading the dials. They may be summarized as follows: (1) With the switch in position A and the interpolation oscillator set to minimum, the main oscillator is tuned for a zero beat; (2) the switch is thrown to position B; (3) the interpolation oscillator is increased in frequency until a zero beat is obtained, the frequency of the received signal may then be read from the oscillator dials.

The accuracy of this system in the embodiment described is 1 part in 10,000. This accuracy is based on the consideration of machine stamping of the oscillator dials. If the calibration of the interpolation oscillator dial is individually determined for each receiver system, then an accuracy of 1 part in 100,000 may be obtained.

It will be noted that it is not necessary to maintain the zero of the interpolation oscillator exactly at 1.000 mc. as long as the change of frequency from the zero to the 100 mark is 10.0 kc. This is true since any long term deviation is cancelled out in the tuning of the main oscillator to the signal. For example, suppose the zero frequency of the interpolation oscillator has deviated to 1.0010, to zero beat a signal at 2.1383 the main oscillator must now be tuned to 2.1383+1.0010+0.800=3.9393 mc. and its dial will again read 2.13 mc. Then to zero beat with the crystal check point 2.1300 the interpolation oscillator must be increased to 1.0093 mc. which is a shift of .0083 mc. and its dial will again read 83. Therefore, it is seen that the dials will again read 2.13 and 83 and the signal will be measured as 2.1383 mc. just as when the interpolation oscillator zeroed at 1.0000 mc.

This invention also permits multiband operation from a single band oscillator, thus avoiding the need for calibrating the oscillators for each band. This is accomplished by using harmonics of the oscillators for the additional bands. This requires band switching only at the R. F. stage 10, mixer 14, buffer amplifier 28, multivibrator 16 and harmonic generator 17, none of which require critical calibration. For convenience in operation, suitable markings should be added to dials 30 and 31 to permit direct reading when harmonics are used. In Figs. 3A and 3B the dials are shown suitably marked for two band operation using the fundamental and second harmonic oscillator frequencies of the embodiment of Fig. 1.

It is apparent that this invention is not limited to the frequencies and apparatus specifically described, and it is understood that the embodiments herein disclosed are merely illustrative of this invention and modifications may of course be made without departing from the spirit and scope of this invention as defined in the appended claims.

The invention described herein may be manufactured and used by or for the Government of the United States of America for governmental purposes without the payment of any royalties thereon or therefor.

What is claimed is:

1. A frequency measuring system comprising, a fixed frequency source for producing a plurality of signals equally spaced in frequency, a first continuously variable frequency source having a range of variation equal to the operating band of the system, a second continuously variable frequency source having a range of variation smaller than said first and equal to the frequency interval between signals of said fixed frequency source, circuit means connected to the outputs of said first and second variable frequency sources for selecting the difference frequency therefrom, frequency comparison means including a mixer connected to said circuit means, and switching means for selectively connecting a signal to be measured and said fixed frequency source to said frequency comparison means.

2. A frequency measuring system comprising, a fixed frequency source, a harmonic generator connected to said fixed frequency source, a first continuously variable frequency source having a range of variation equal to said fixed frequency, a second continuously variable frequency source having a range of variation greater than said first and defining the operating band of the system, circuit means connected to the outputs of said first and second variable frequency sources for selecting the difference frequency therefrom, frequency comparison means including a mixer connected to said circuit means, and switching means for selectively connecting a signal to be measured and said harmonic generator to said frequency comparison means.

3. A frequency measuring system comprising, a fixed frequency source, a harmonic generator connected to said fixed frequency source, a first continuously variable frequency source having a range of variation equal to said fixed frequency, a second continuously variable frequency source having a range of variation greater than said first and defining the operating band of the system, a first mixer circuit connected to said first and second variable frequency sources for selecting the difference frequency therefrom, frequency comparison means including a second mixer connected to said first mixer circuit, and switching means for selectively connecting a signal to be measured and said harmonic generator to said frequency comparison means.

4. A frequency measuring system comprising a fixed frequency source, a harmonic generator connected to said fixed frequency source, a first continuously variable frequency source having a range of variation equal to said fixed frequency, a second continuously variable frequency source having a range of variation greater than said first and defining the operating band of the system, a first mixer circuit connected to said first and second variable frequency sources, a second mixer circuit connected to said first mixer circuit, switching means for selectively connecting a signal to be measured and said harmonic generator to said second mixer circuit, and a zero beat indicator connected to said second mixer circuit.

5. A frequency measuring system comprising, a first fixed frequency source, a harmonic generator connected to said fixed frequency, a first continuously variable frequency source having a range of variation equal to said fixed frequency, a second continuously variable frequency source having a range of variation greater than said first and defining the operating band of the system, a first mixer circuit connected to said first and second variable frequency sources, a second mixer circuit connected to said first mixer circuit, switching means for selectively connecting a signal to be measured and said harmonic generator to said second mixer circuit, an intermediate frequency amplifier connected to said second mixer circuit, a second fixed frequency source tuned to said intermediate frequency and connected to said intermediate frequency amplifier, and zero beat indicating means connected to said intermediate frequency amplifier.

6. A frequency measuring system comprising, a first fixed frequency source, a harmonic generator connected to said fixed frequency source, a first continuously variable frequency source having a range of variation equal to said fixed frequency, a second continuously variable frequency source having a range of variation greater than said first and defining the operating band of the system, a first mixer circuit connected to said first and second variable frequency source and tuned to select the difference frequency therefrom, a second mixer circuit connected to the output of said first mixer circuit, switching means for selectively connecting a signal to be measured and said harmonic generator to said second mixer circuit, said second mixer circuit being tuned to select the difference frequency between the output of said first mixer circuit and the output of said switching means, an intermediate frequency amplifier connected to said second mixer circuit, a second fixed frequency source tuned to said intermediate frequency and connected to said intermediate frequency amplifier, and zero beat indicating means connected to said intermediate frequency amplifier.

7. A frequency measuring system comprising, a superheterodyne receiver including a continuously variable local oscillator means and a fixed frequency beat frequency oscillator, said local oscillator means having a first calibrated means for tuning said receiver to zero beat with an incoming signal of unknown frequency, a source of equally spaced fixed frequencies and means for selectively connecting said source to said receiver, said local oscillator means having a second calibrated means for tuning said receiver to zero beat with the single fixed frequency of said source nearest a given side of the unknown signal, each of said calibrated tuning means being calibrated so that the unknown frequency may then be read directly therefrom.

References Cited in the file of this patent

UNITED STATES PATENTS

| | | |
|---|---|---|
| 1,947,182 | Betts | Feb. 13, 1934 |
| 2,131,559 | Granger | Sept. 27, 1938 |
| 2,324,077 | Goodale et al. | July 13, 1943 |
| 2,393,856 | Collins | Jan. 29, 1946 |
| 2,451,320 | Clammer | Oct. 12, 1948 |
| 2,491,494 | Grimm | Dec. 20, 1949 |
| 2,501,591 | Bach | Mar. 21, 1950 |